(12) United States Patent
Asakawa et al.

(10) Patent No.: US 7,913,191 B2
(45) Date of Patent: Mar. 22, 2011

(54) COMMON INPUT/OUTPUT INTERFACE FOR APPLICATION PROGRAMS

(75) Inventors: Chieko Asakawa, Yokohama (JP); Tatsuya Ishihara, Yamato (JP); Takashi Itoh, Machida (JP); Hironobu Takagi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 11/681,908

(22) Filed: Mar. 5, 2007

(65) Prior Publication Data

US 2008/0040513 A1 Feb. 14, 2008

(30) Foreign Application Priority Data

Mar. 17, 2006 (JP) ................................ 2006-074221

(51) Int. Cl.
*G06F 3/00* (2006.01)
*G06F 17/00* (2006.01)
*G06F 17/30* (2006.01)

(52) U.S. Cl. ......................... 715/853; 715/249; 707/729

(58) Field of Classification Search .................. 715/205, 715/249; 707/729, 104
See application file for complete search history.

(56) References Cited

U.S. PATENT DOCUMENTS

| | | | |
|---|---|---|---|
| 5,745,902 A * | 4/1998 | Miller et al. | 707/200 |
| 5,911,776 A * | 6/1999 | Guck | 709/217 |
| 6,336,124 B1 * | 1/2002 | Alam et al. | 715/205 |
| 6,938,083 B1 * | 8/2005 | Teague | 709/225 |
| 2003/0163519 A1 * | 8/2003 | Kegel et al. | 709/203 |
| 2004/0003048 A1 * | 1/2004 | Stillman et al. | 709/207 |
| 2004/0015890 A1 * | 1/2004 | Wong et al. | 717/137 |
| 2004/0199870 A1 | 10/2004 | Anderson | |
| 2005/0097454 A1 * | 5/2005 | Kinno et al. | 715/513 |
| 2005/0154979 A1 * | 7/2005 | Chidlovskii et al. | 715/513 |
| 2005/0273721 A1 * | 12/2005 | Yantis | 715/762 |

(Continued)

FOREIGN PATENT DOCUMENTS

CN 15372851 A 10/2004

(Continued)

OTHER PUBLICATIONS

Blenkhorn, Paul et al. "Augmenting the User Interface of Microsoft Outlook and Internet Explorer for Screenreaders". International Technology and Persons with Disabilities Conference, 2002.

(Continued)

*Primary Examiner* — Dennis-Doon Chow
*Assistant Examiner* — Linh K Pham
(74) *Attorney, Agent, or Firm* — Jordan IP Law, PC

(57) ABSTRACT

A user interface through which multiple application programs can be operated in common. An information processing apparatus provides a common input/output interface to multiple application programs. The apparatus includes a section which converts an application-specific document generated by each of the plurality of application programs and represented in a data structure specific to the application program to a common document represented in a common data structure; a section which presents the common document to a user; a section which inputs an operation performed by the user on the common document; an interface adapter which converts an object contained in the common document to an object used in the output section; a section which modifies the common document in accordance with an operation by the user; and a section which reflects modifications to the common document in the application-specific document.

10 Claims, 21 Drawing Sheets

U.S. PATENT DOCUMENTS

| | | | |
|---|---|---|---|
| 2007/0046512 A1* | 3/2007 | Tabuchi | 341/118 |
| 2007/0070814 A1* | 3/2007 | Frodyma et al. | 367/134 |
| 2008/0040513 A1* | 2/2008 | Asakawa et al. | 710/1 |
| 2008/0256438 A1* | 10/2008 | Harman et al. | 715/239 |

FOREIGN PATENT DOCUMENTS

| | | |
|---|---|---|
| JP | 10-083269 | 3/1998 |
| JP | PUPA1998-083269 | 3/1998 |
| JP | 2002-229843 | 8/2002 |
| JP | PUPA2002-229843 | 8/2002 |
| JP | PUPA2003308312 | 10/2003 |
| JP | PUPA2005063243 | 3/2005 |
| JP | 2005-092504 | 4/2005 |
| JP | PUPA2005-092504 | 4/2005 |

OTHER PUBLICATIONS

Walshe, Esmond et al. "Accessing Web Based Documents Through a Tree Structural Interface", International Conference on Computers Helping People with Special Needs 2004.

\* cited by examiner

```
<text>
<style fontColor="red" fontsize="12">
<p>Hello world.</p>
</text>
```

FIG. 3A

```
<text fontColor="red" fontSize="12">
<p>Hello world.</p>
</text>
```

FIG. 3B

|  | SCHEMA ID | CORRESPONDING OBJECT |
|---|---|---|
| APPLICATION SPECIFIC DOCUMENT | fontColor | text/style/@fontColor |
| COMMON DOCUMENT |  | text/@fontColor |

FIG. 3C

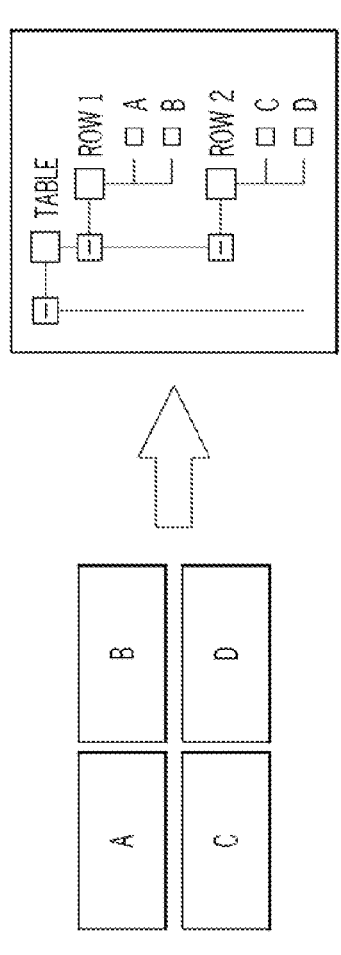
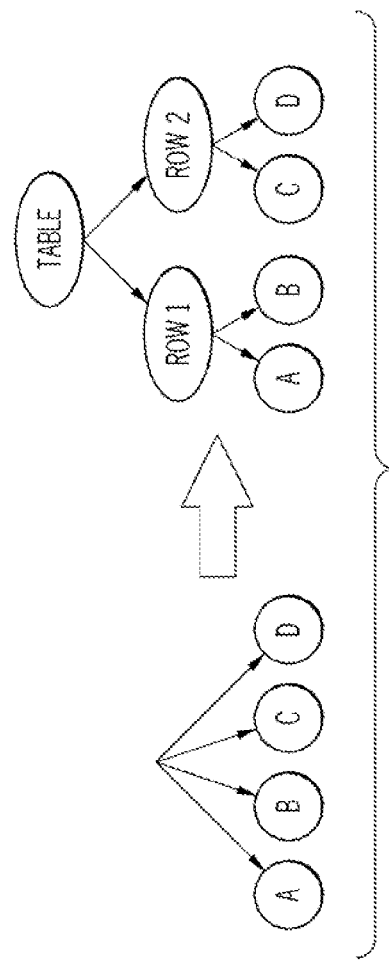

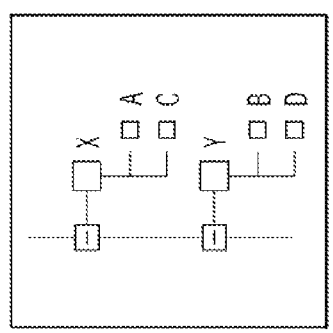
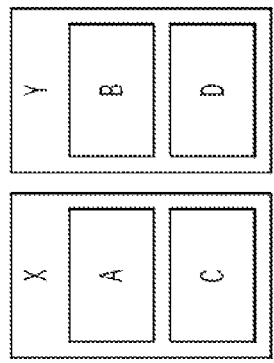
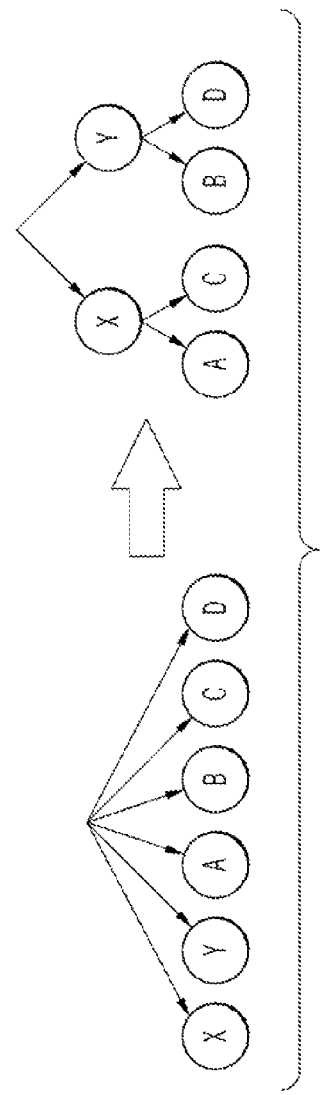
FIG. 6A
FIG. 6B

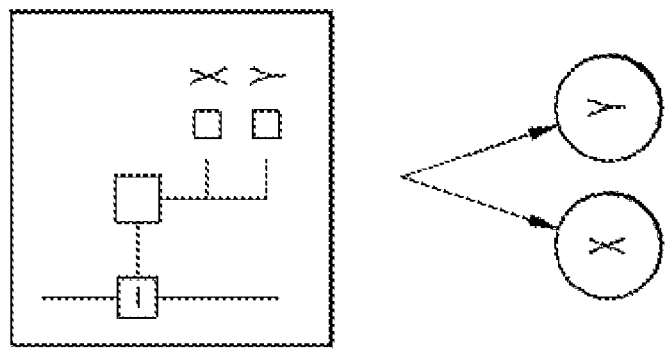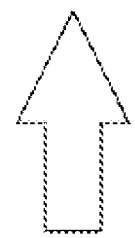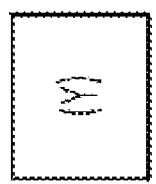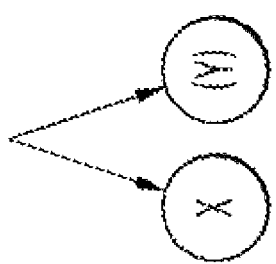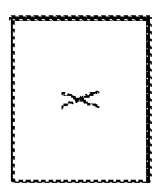
FIG. 9

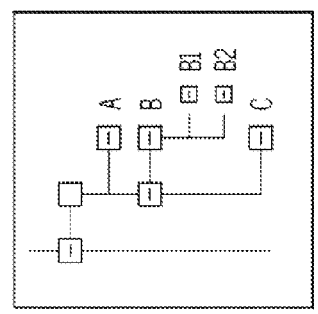
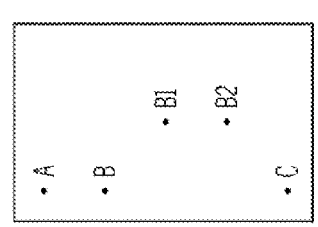
FIG. 10A
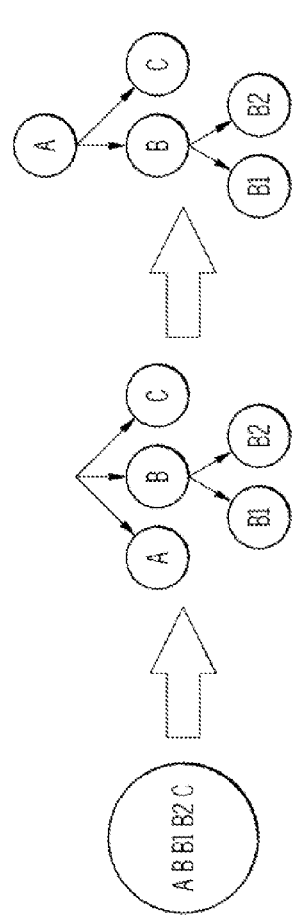
FIG. 10B

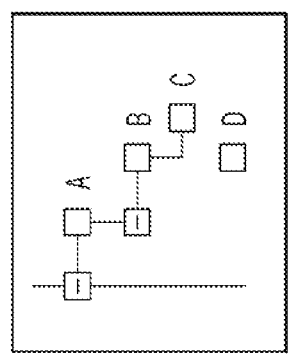
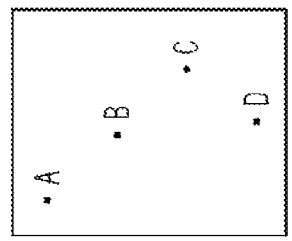
FIG. 12A
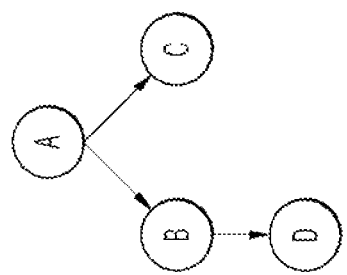
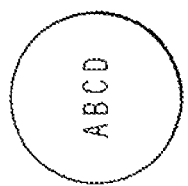
FIG. 12B

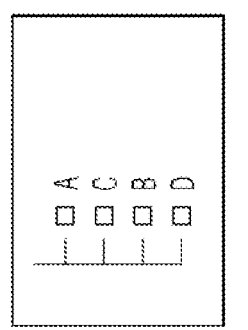
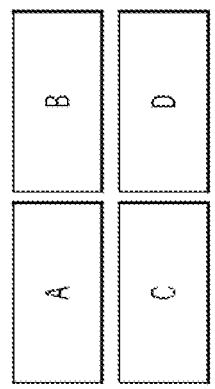
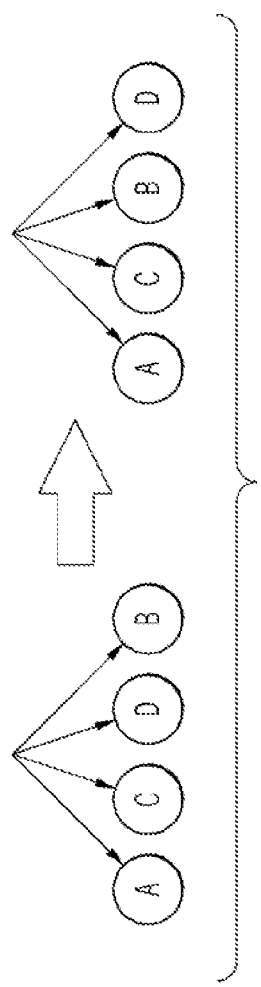
FIG. 14A
FIG. 14B

COMMON INPUT/OUTPUT INTERFACE FOR APPLICATION PROGRAMS

FIELD OF THE INVENTION

The present invention relates to information processing apparatus, methods, and program products that provide an input and output interface common to multiple application programs.

BACKGROUND

Screen readers that output text displayed on a computer display screen as speech are known. Visually impaired users, for example, use such screen readers along with a keyboard to interface with application programs.

Techniques to improve the usability of computer access are known, such as those described in: Published Unexamined Patent Application No. 2005-92504; Published Unexamined Patent Application No. 2002-229843, Published Unexamined Patent Application No. 10-83269; Paul Blenknorn and Careth Evans, "Augmenting the user interface of Microsoft Outlook and Internet Explorer for screen readers", International Technology and Persons with Disabilities Conference 2002; and Esmond Walshe and Barry McMullin, "Accessing Web Based Documents Through a Tree Structural Interface", International Conference on Computers Helping People with Special Needs, 2004.

Patent Application No. 2005-92504 describes an information processing apparatus that generates a user interface in accordance with profile information including user information. Patent Application No. 2002-229843 describes a method for linking from selected information to a subset of the information if the selected information is complicated. Patent Application No. 10-83269 describes an apparatus that determines a section of interest in a screen in response to a change in the screen as a trigger and generates a new, converted screen based on the section of interest. Blenknorn and Evans describe the advantage of using an adaptive interface in reading aloud text in existing application programs by means of a screen reader. Walshe and McMullin propose accessing Web pages through an interface that transforms the pages to a free structure.

Conventional application programs display information that is mainly composed of text on a display screen. Conventional screen readers therefore can output text displayed newly by an application program on a display screen as speech in an orderly sequence to render the information displayed on the display screen intelligible to visually impaired users. However, today's application programs use sophisticated graphics to present complicated displays. Consequently, it is becoming difficult to render information displayed on a display screen intelligible to visually impaired users with a conventional screen reader.

Different application programs use different specific user interfaces and therefore different keyboard operations. If a user uses many application programs, it is burdensome for the user to become familiar with their operations. In order to ensure the accuracy of speech output and operability, a screen reader may be designed for each individual application program. With sophistication of the functionality of application programs, the work required to make modifications to screen readers associated with modifications to the application programs has increased.

Blenknorn and Evans do not make any mention of provision of the same adaptive interface for different applications, nor do they make any mention of editing by an adaptive interface and an application in synchronization with each other. Walshe and McMullin address only Web pages and therefore do not mention provision of an interface common to different applications, nor do they mention editing documents.

SUMMARY

According to a first aspect of the present invention, there are provided an information processing apparatus which provides a common input/output interface to multiple application programs, and an information processing method and a program that relate to the apparatus, the information processing apparatus including: a document converting section which converts an application-specific document generated by each of the plurality of application programs and represented in a data structure specific to the application program to a common document represented in a common data structure; an output section which presents the common document to a user; an input section which inputs an operation performed by the user on the common document; an interface adapter section which converts an object contained in the common document to an object used in the output section; a modifying section which modifies the common document in accordance with an operation by the user; and a modification reflecting section which reflects a modification to the common document in the application-specific document.

According to aspects of the present invention, a user interface can be provided that enables multiple application programs to be operated in common to improve the accessibility of the application programs by, for example, visually impaired users.

BRIEF DESCRIPTION OF THE DRAWINGS

The invention, which is described in detail below, may be best understood with reference to the accompanying drawings, in which:

FIG. 3(A) shows an example of description of a text object contained in an application-specific document; FIG. 3(B) shows an example of description of a text object contained in a common document; FIG. 3(C) shows an example of an object conversion schema stored in a document conversion rule storing section according to an embodiment of the present invention;

FIG. 5 shows an example of operation for detecting table objects;

FIG. 6 shows an example of operation for regrouping;

FIG. 9 shows an example of operation for displaying a text alternative to non-text objects;

FIG. 10 shows an example of the step of extracting labels;

FIG. 12 shows an example of operation for extracting a list structure;

FIG. 14 shows an example of sorting objects;

DETAILED DESCRIPTION

While the present invention will be described below with respect to embodiments thereof, the embodiments are not intended to limit the scope of the present invention.

Figure 1:
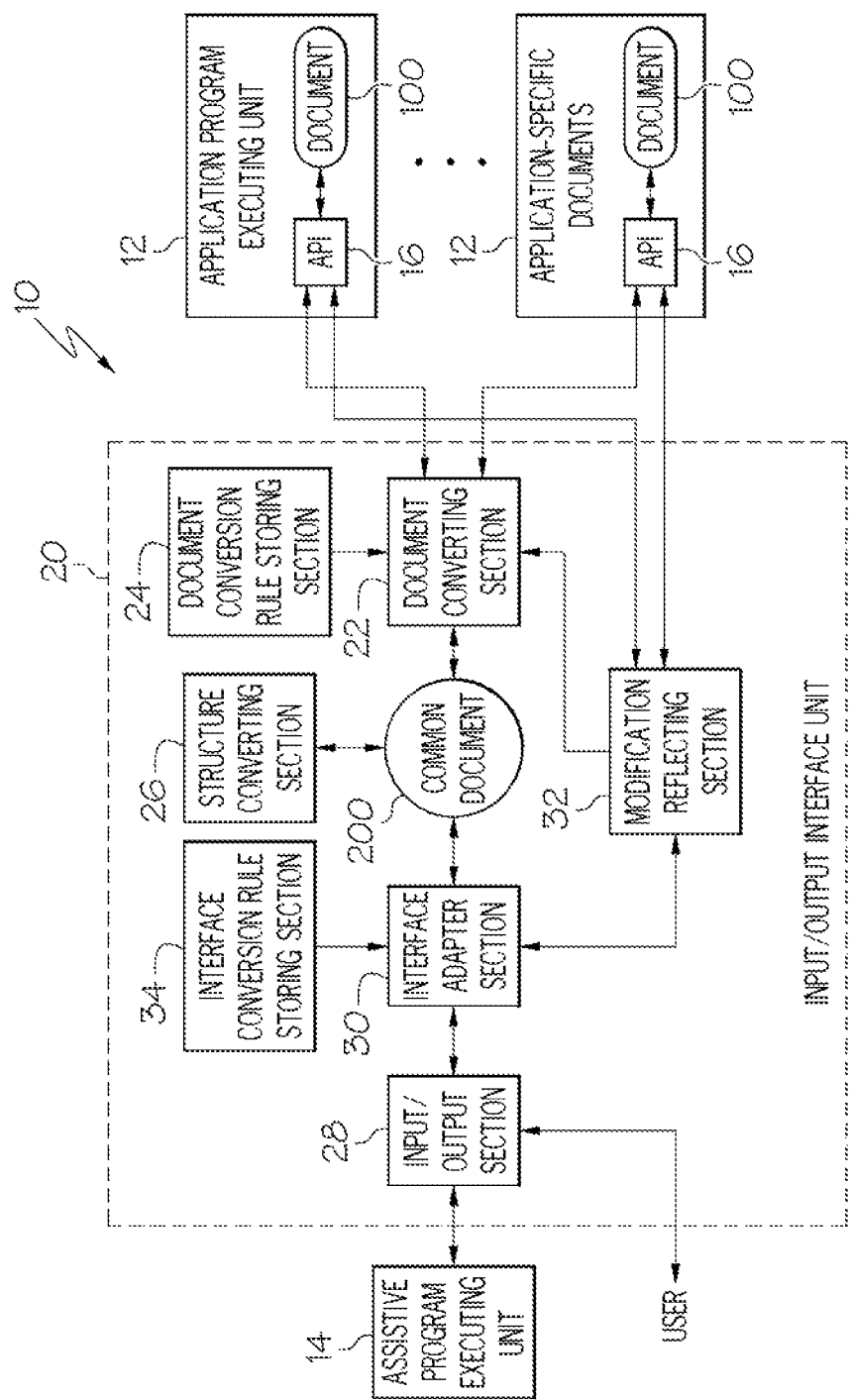
FIG. 1 is a functional block diagram of an information processing apparatus according to an embodiment of the present invention.

FIG. 1 is a functional block diagram of an information processing apparatus 10 according to an embodiment of the invention. The information processing apparatus 10 includes one or more application program executing unit 12, an assistive program executing unit 14, and an input/output interface unit 20. The application program executing units 12 execute application programs to cause the information processing apparatus 10 to implement functions of the application programs. For example, each of the application program executing units 12 executes an application program such as a word processing program, a spreadsheet program, and a presentation program to cause the information processing apparatus 10 to function as a word processor, a spreadsheet apparatus, and a presentation apparatus.

Each application program executing unit 12 may have an application-specific document 100 in an application-specific data, structure that contains objects generated by an application program executed by the application program executing unit 12. Each application program executing unit 12 may have an API (Application Program Interface) 16. The API 16 mediates access to an application-specific document 100 from a functional block that executes another program. The functional block executing the different program can read and modify objects contained in the application-specific document 100 generated by the application program through the intervention of the API 16. For example, an application program can access an XML (Extensible Markup Language) document generated by another application program through a DOM (Document Object Model) API developed by a standard-setting organization, W3C.

The assistive program executing unit 14 executes an assistive program that assists a user in accessing an application program to cause the information processing apparatus 10 to implement functions of input/output devices for the application program. If the information processing apparatus 10 provides an audio output interface such as speakers and headphones, the assistive program executing unit 14 may execute a text reader program to cause the information processing apparatus 10 to function as a text reader having the capability of reading aloud text generated by an application program. The assistive program executing unit 14 may also execute an editing application program, for example, to cause the information processing apparatus 10 to function as an editing device for editing an application-specific document 100 from the outside of an application program.

The input/output interface unit 20 provides a common input/output interface to multiple application programs. In particular, the input/output interface unit 20 functions as a common user interface for a user to access multiple application programs. The input/output interface unit 20 may provide a common operating environment for multiple application programs such as a word processing program, a spreadsheet program, and a presentation program. The input/output interface unit 20 also functions as an input/output interface between multiple application programs and a common assistive program shared by them. For example, the input/output interface unit 20 connects an assisting device (for example a text reader) shared by multiple application programs such as a word processing program, a spreadsheet program, and a presentation program to these programs.

The input/output interface unit 20 includes a document converting section 22, a document conversion rule storing section 24, a structure converting section 26, an input/output section 28, an interface adapter section 30, a modification reflecting section 32, and an interface conversion rule storing section 34. The document converting section 22 converts an application-specific document 100 generated by each of the multiple application programs and represented using a data structure specific to the application program into a common document 200 represented in a common data structure. That is, the document converting section 22 reads each of application-specific documents 100 having different data structures specific to different application programs and converts the read application-specific document 100 into a predetermined common data structure. For example, the document converting section 22 converts objects contained in an application-specific document 100 to a common document 200 having a data structure that represents the objects as nodes of a tree structure.

The document converting section 22 may access an application-specific document generated by an application program through the API 16 to obtain and modify objects contained in the application-specific document 100. If an object contained in an application-specific document 100 is modified by an application program, the document converting section 22 may reflect the modification in a corresponding object contained in a corresponding common document 200.

The document conversion rule storing section 24 stores a conversion rule for converting objects contained in an application-specific document 100 to objects in a common data structure. The document converting section 22 may convert objects contained in an application-specific document 100 to objects in a common structure in accordance with a conversion rule if the conversion rule for the objects contained in the application-specific document 100 is stored in the document conversion rule storing section 24.

The structure converting section 26 converts the data structure of the common document 200 in such a manner that a visually impaired user can easily recognize information in the common document 200 output by a text reader as speech. In particular, the structure converting section 26 detects whether at least one attribute selected from the group consisting of the position, size, color, and font type of each of the objects contained in a common document 200 with which the object is to be displayed by a relevant application program satisfies a condition predetermined for at least one predetermined data structure selected between a predetermined table structure and predetermined list, data structure. If the condition is satisfied, the structure converting section 26 assigns each of the multiple objects to a node of the predetermined data structure that satisfies the condition to convert the data structure of the common document 200.

The input/output section 28 has functions of both of an output section and an input section according to the present invention, presents objects contained in a common document 200 to a user, and inputs a user operation on objects contained in the common document 200. For example, the input/output section 28 displays the common document 200 on a display device and inputs a user operation performed through an input device. The input/output section 28 generates a user interface for a common document 200. The input/output section 28 also displays objects contained in the common document 200 on the display device as a hierarchical tree structure.

The input/output section 28 may also output objects contained in the common document 200 to the assistive program executing unit 14 and may input modifications to objects contained in the common document 200 from the assistive program executing unit 14. That is, the input/output section 28 generates an input/output interface of the common document 200 to the assistive program executing unit 14. For example, if the information processing apparatus 10 provides a common audio output interface to multiple application programs, the input/output section 28 may output text contained in a common document 200 to a text reader having the capability of reading aloud text to cause the common document 200 reader to read the text aloud.

The interface adapter section 30 converts the objects contained in a common document 200 to objects used in the input/output section 28. The interface adapter section 30 also functions as an example of a modifying section according to the present invention and modifies the common document 200 in accordance with a user operation inputted by the input/output section 28. The interface adapter section 30 may modify a common document 200 in accordance with a user operation inputted by the input/output section 28 through the assistive program executing unit 14. The interface adapter section 30 extracts from a common document 200 objects that should be displayed on the display device and causes the input/output section 28 to display them. The interface adapter section 30 extracts from a common document 200 objects that should be output to the assistive program executing unit 14 and causes the input/output section 28 to output them.

The interface conversion rule storing section 34 stores a conversion rule used for converting objects contained in a common document 200 in a common data structure to objects in a data structure used in the input/output section 28. The interface adapter section 30 may convert objects contained in a common document 200 in a common data structure into objects in the data structure used in the input/output section 28 in accordance with a conversion rule if the conversion rule for the objects used in the input/output section 28 is stored in the interface conversion rule storing section 34.

The modification reflecting section 32 reflects a modification to an object contained in a common document 200 in an application-specific document 100. That is, if an object contained in a common document 200 is modified through the input/output section 28, the modification reflecting section 32 may access an application-specific document 100 generated by an application program through the API 16 to modify the corresponding object in the application-specific document 100.

Because the input/output interface unit 20 described above converts the format of an application-specific document 100 generated by an application program to a common document 200 in the common data structure, the input/output interface unit 20 can provide a common user interface to multiple application programs. Thus, the input/output interface unit 20 can provide a common operation environment for different application programs and thereby can relieve difficulties for visually impaired users operating the application programs.

The input/output interlace unit 20 reflects both in the common document 200 and in an application-specific document 100 a modification to an object made by a user. Thus, a display by an application program can be synchronized with a display by an input/output interface unit 20. The input/output interface unit 20 therefore can provide for example an environment in which a visually-impaired person operates application programs with the assistance of a sighted person. Furthermore, the input/output interface unit 20 can seamlessly switch between a display presented to a sighted person and a display presented to a visually impaired person.

Figure 2A:
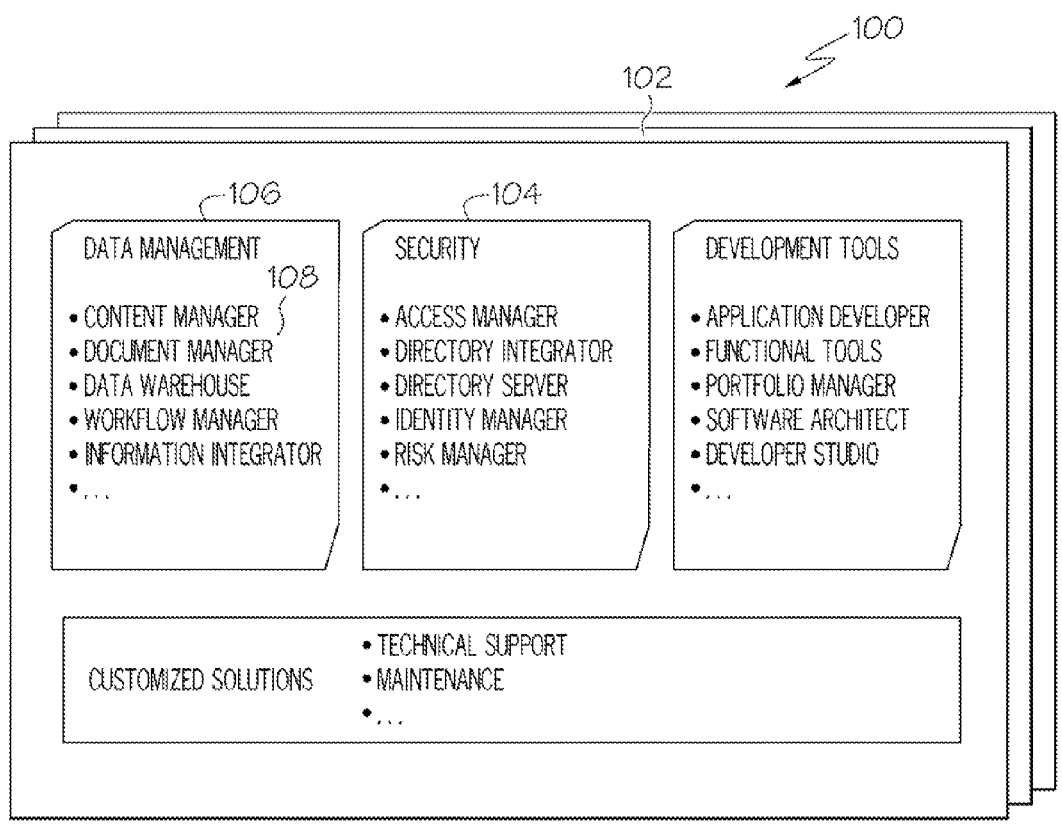
FIG. 2(A) shows an example of an application-specific document generated by a presentation program.
Figure 2B:
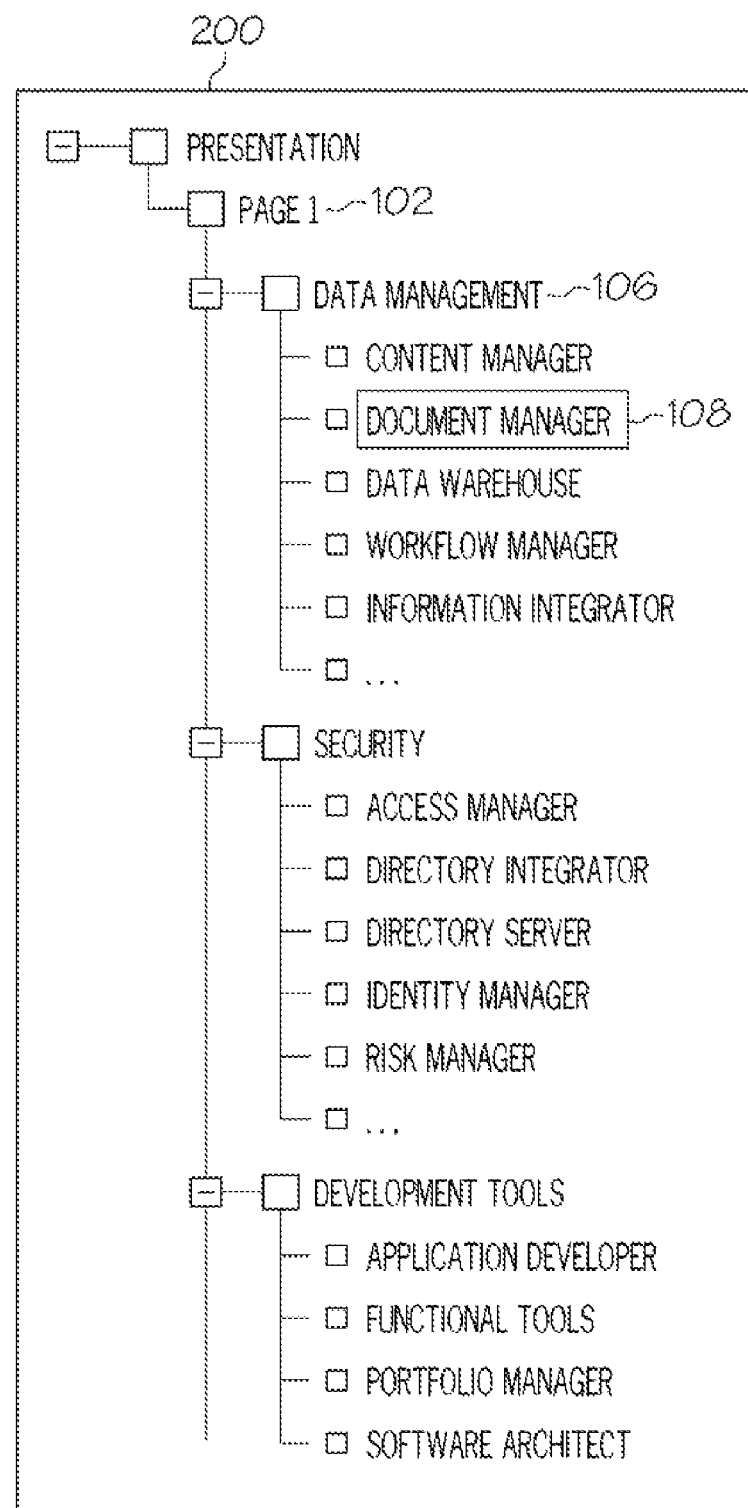
FIG. 2(B) show's an example of a common document in a common structure generated as a result of conversion of the application-specific document in FIG. 2(A)

FIG. 2(A) shows an example of an application-specific document 100 generated by a presentation program; FIG. 2(B) shows an example of a common document 200 in a common data structure converted from the application-specific document 100 in FIG. 2(A). The presentation program generates application-specific documents 100 visually representing a hierarchical relation among objects. For example, the presentation program generates an application-specific document 100 including page objects 102 on which graphical objects 104 and text objects 106, 108 are provided as shown in FIG. 2(A). The presentation program also generates an application-specific document 100 in which the text objects 106, 108 are arranged hierarchically according to display positions, fonts, and size.

The document converting section 22 converts the objects 102 to 108 contained in the application-specific documents 100 to a common document 200 that represents the objects as nodes of a tree structure as shown in FIG. 2(B). For example, the document converting section 22 converts an application-specific document 100 into a common document 200 in which each page object 102 is positioned at the top level and the text objects 106, 108 displayed on that page object 102 are positioned at lower-level nodes.

In this way, the input/output interface unit 20 can convert a visually represented document into a document in text form. Thus, the input/output interface unit 20 can generate a document readily intelligible to visually impaired users when speech is output through a text reader. Furthermore, because the input/output interface unit 20 arranges objects in a tree structure, visually impaired users can readily comprehend the hierarchical relation among the objects when an object is output as a speech through a text reader.

FIG. 3(A) shows an exemplary description of a text object contained in an application-specific document 100; FIG. 3(B) shows an exemplary description of a text object contained in a common document 200; and FIG. 3(C) shows an exemplary conversion schema stored in the document conversion rule storing section 24 for converting the font colors of text objects according to the embodiment.

The document conversion rule storing section 24 may store for each application program a conversion schema indicating a conversion rule for converting obtained objects described in a description format specified in the API 16 into a description format in a common data structure. When objects in an application-specific description format are obtained from an application-specific document 100, the document converting section 22 may refer to the conversion schema stored in the document conversion rule storing section 24 to convert obtained objects into a description format in the common data structure.

A conversion schema has a structure in which an ID unique to each object, a description definition of the object in an application-specific document 100, and a description definition of the object in a common document 200 are described in association with each other. For example, an ID identifying an object that specifies a font color is described in the conversion schema shown in FIG. 3(C). Also described in the conversion schema is that the font color in the application-specific document 100 (FIG. 3(A)) can be obtained from the attribute "fontColor" described in the element <style> under the element <text>. Also described in the conversion schema is that the font color in the common document 200 (FIG. 3(B)) can be obtained from the attribute <fontColor> under the element <text>.

With the input/output interface unit 20, creation of a conversion schema for a new application program is all that requires to provide an input/output interface for the new application program and no modifications to the application are required. Thus, the input/output interface unit 20 can lighten developing workload for supporting a text reader.

Figure 4:
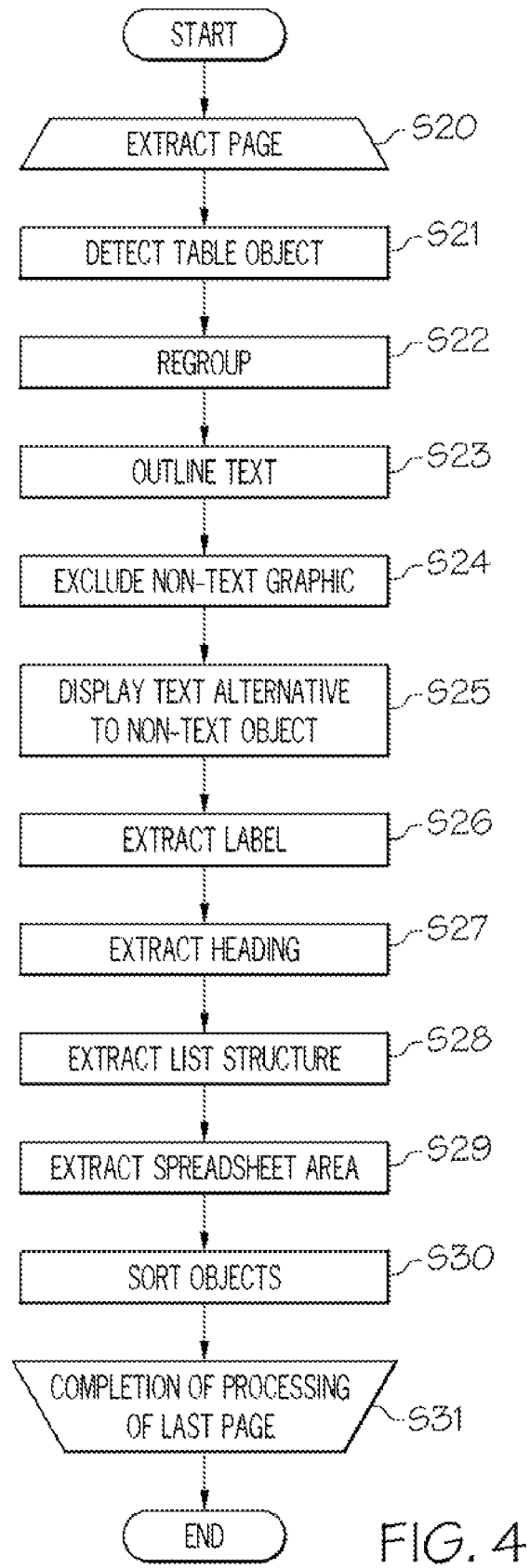
FIG. 4 shows a process flow for converting a data structure of a common document.

FIG. 4 shows an example of flow of a process performed by the structure converting section 26 for converting the data structure of a common document 200. The structure converting section 26 extracts objects contained in a page (the unit of slide in a presentation program or the unit of paper in a word processor) from a common document 200 and performs steps S21 to S30 on a page-by-page basis (step S20, S31). The structure converting section 26 performs fable object detection (step S21), regrouping (step S22), text, outlining (step S23), exclusion of non-text graphics (step S24), displaying text alternatives to textless objects (step S25), label extraction (step S26), heading extraction (step S27), list structure extraction (step S28), spreadsheet area detection (step S29), and object sorting (step S30) for each page. After the last page is processed, the structure conversion process will end (step S31).

Referring to FIGS. 5 to 14, these operations will be described below. Symbol (A) in FIGS. 5 to 14 denotes a change from a display image on an application before structure conversion to a display image in a tree structure after the structure conversion and symbol (B) denotes a change from a tree structure before structure conversion to a tree structure after the structure conversion.

FIG. 5 shows an example of an operation for detecting a table object (step S21 of FIG. 4). If multiple text objects are arranged in a rectangular table, the structure converting section 26 detects the positions of each text object in the page to detect the row and column in which the text object is positioned in the rectangular arrangement. The structure converting section 26 then adds a virtual table object indicating the detected table and virtual rows (or columns) indicating the rows (or columns) of the detected table to a common document 200. The structure converting section 26 positions each text object at a level below a corresponding virtual row (or column) object. Thus, the structure converting section 26 can render text objects arranged in tabular form recognizable to visually impaired users.

FIG. 6 shows an example of operation for regrouping objects (step S22 of FIG. 4). If multiple graphic objects are overlapping, the structure converting section 26 detects groups of the overlapping graphic objects and also detects the hierarchical relation between the graphic objects in each group. The structure converting section 26 then generates a tree structure for each of the detected groups and forms hierarchical levels of the tree structure in each group in accordance with the hierarchical relation detected among the objects in the group. The structure converting section 26 may determine the hierarchical relation in a group in accordance with the ratio of the overlapping area between graphic objects, for example. Thus, the structure converting section 26 can render a group of graphical objects and the hierarchical relation between the objects in the group identifiable to visually impaired users.

Figure 7A:
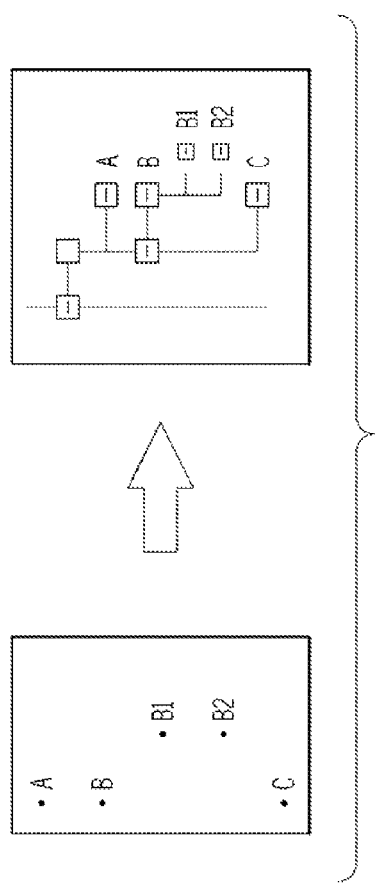
FIG. 7 shows an example of operation for outlining text.
Figure 7B:
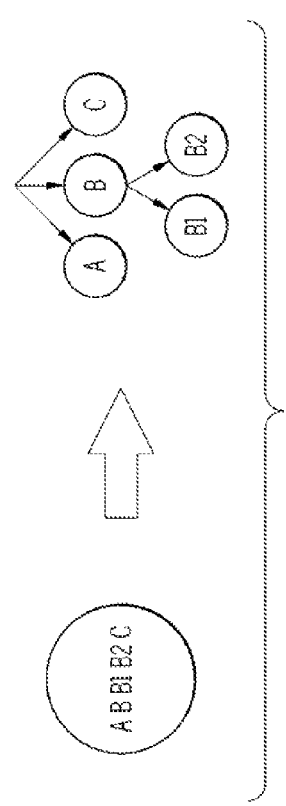

FIG. 7 shows an example of operation for outlining text (step S23 of FIG. 4). If multiple text objects, including text objects for which indentations are set, are provided, the structure converting section 26 positions text objects that are not indented at an upper level in a tree structure and positions the indented text objects at a lower level. Thus, the structure converting section 26 can enable indented position between text objects to be identifiable to visually impaired users.

Figure 8A:
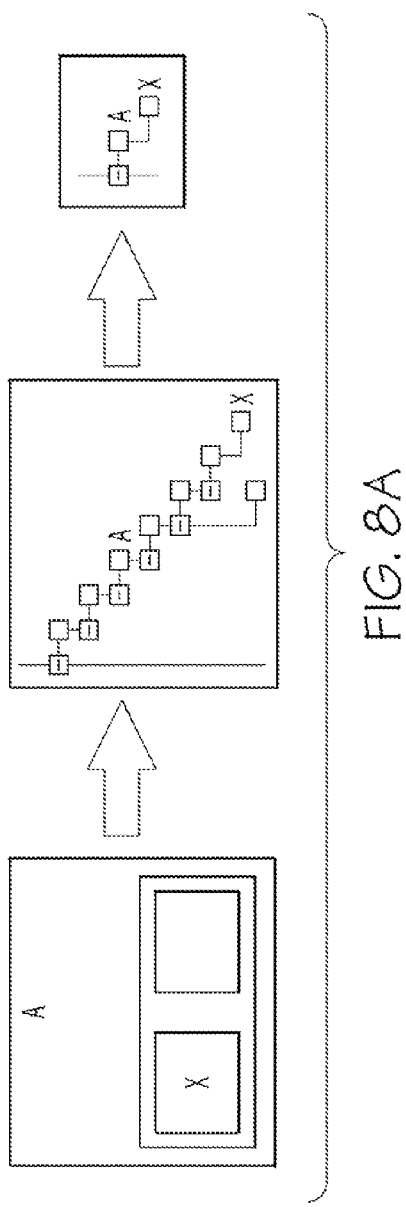
FIG. 8 shows an example of operation for excluding textless graphics.
Figure 8B:
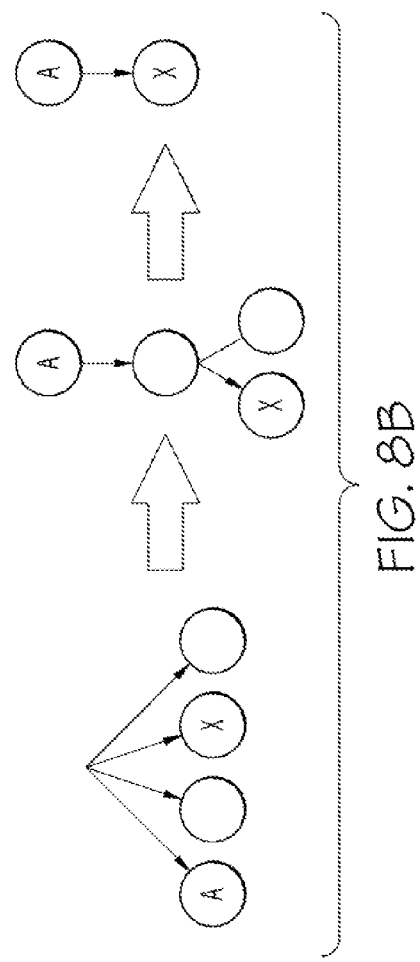

FIG. 8 shows an example of operation for excluding textless graphics (step S24 of FIG. 4). If graphic objects containing text information are mixed with graphic objects that do not contain text information, the structure converting section 26 exclude the graphic objects that do not contain text information from a tree structure In this way, the structure converting section 26 excludes irrelevant information to make text objects readily accessible to visually impaired users.

FIG. 9 shows an example of operation for displaying text alternatives to non-text objects (step S25 of FIG. 4). If objects to which text alternatives are added are provided, the structure converting section 26 places the text alternatives in place of or in addition to those objects. The structure converting section 26 may place text objects generated through character recognition, for example, if text alternatives are not added. Thus, the structure converting section 26 can make the contents of objects to be identifiable to visually impaired users with text alternatives who have difficulty recognizing the shapes and positions of objects.

FIG. 10 shows an example of operation for extracting labels (step S26 of FIG. 4). If a document contains highlighted text objects compared to others (for example objects in a larger font size or in boldface), the structure converting section 26 determines that the highlighted text objects are "labels" and positions them at an upper level in a tree structure. Thus, the structure converting section 26 generates a tree structure in which label information contained in text is reflected, thereby making the text more accessible to visually impaired users.

Figure 11A:
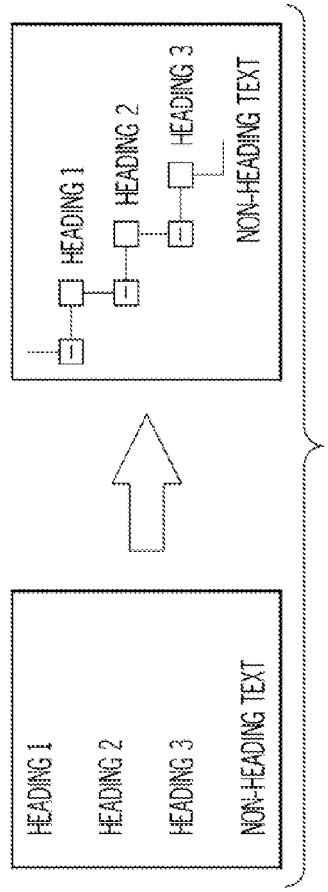
FIG. 11 shows an example of operation for extracting headings.
Figure 11B:
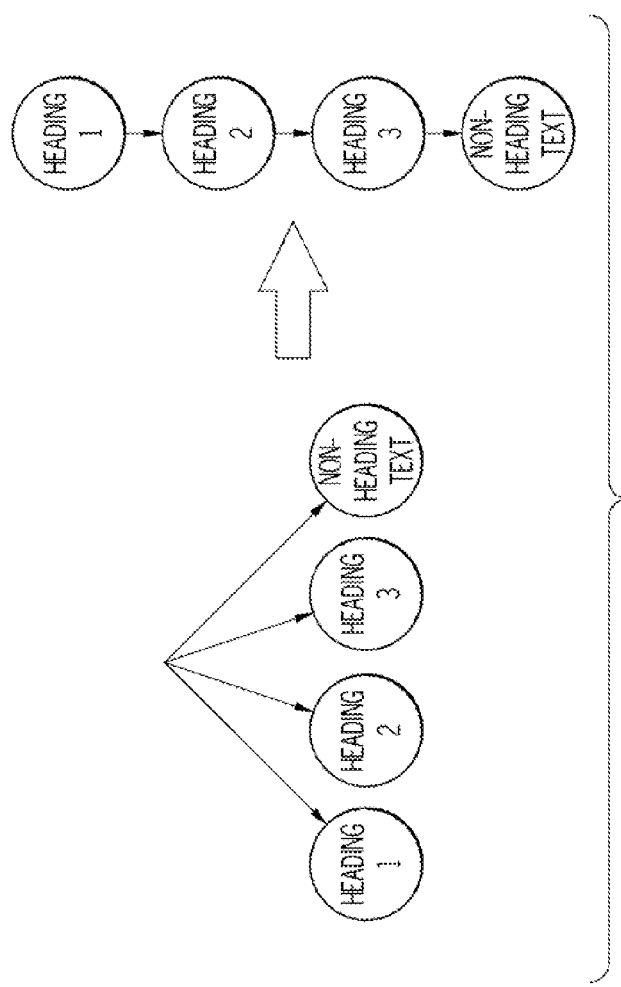

FIG. 11 shows an example of operation for extracting headings (step S27 of FIG. 4). If text objects arranged in parallel include a text object in a font different from the others, the structure converting section 26 determines that the text object in the different font is a heading and positions it at an upper level than the other text objects in a tree structure. Thus, the structure converting section 26 can generate a tree structure that accurately represents the structure of the text, thereby making the text more accessible to visually impaired users.

FIG. 12 shows an example of operation for extracting a list structure (step S28 of FIG. 4). If text data is separated by special symbols or indentations, the structure converting section 26 divides the text data into different text objects at each special symbol or indentation. The structure converting section 26 hierarchizes the separated text objects in accordance with the positions of the special symbols or indentations. Thus, the structure converting section 26 can generate a tree structure that, accurately represents the structure of the text, thereby making the text, more accessible to visually-impaired users.

Figure 13A:
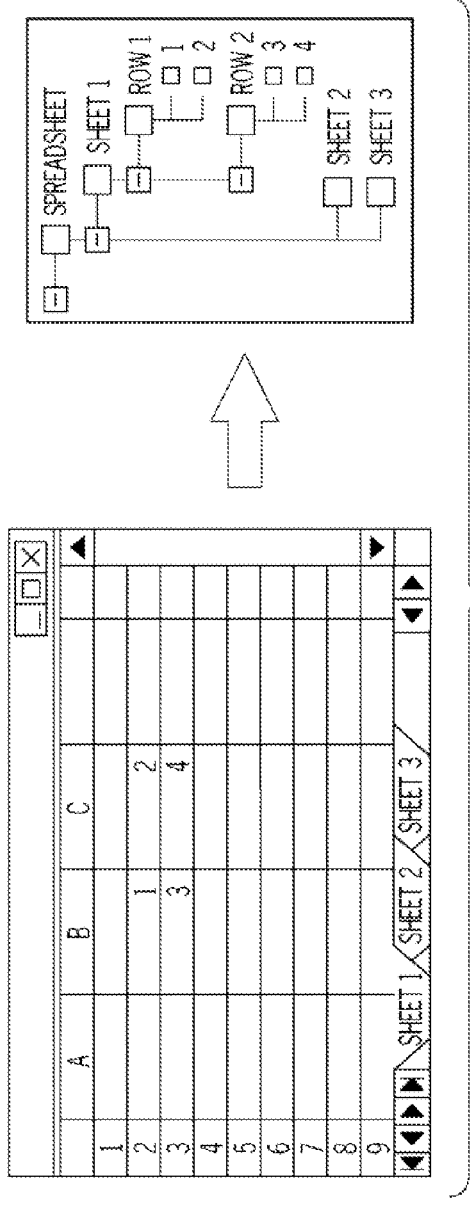
FIG. 13 shows an example of operation for detecting a spreadsheet area.
Figure 13B:
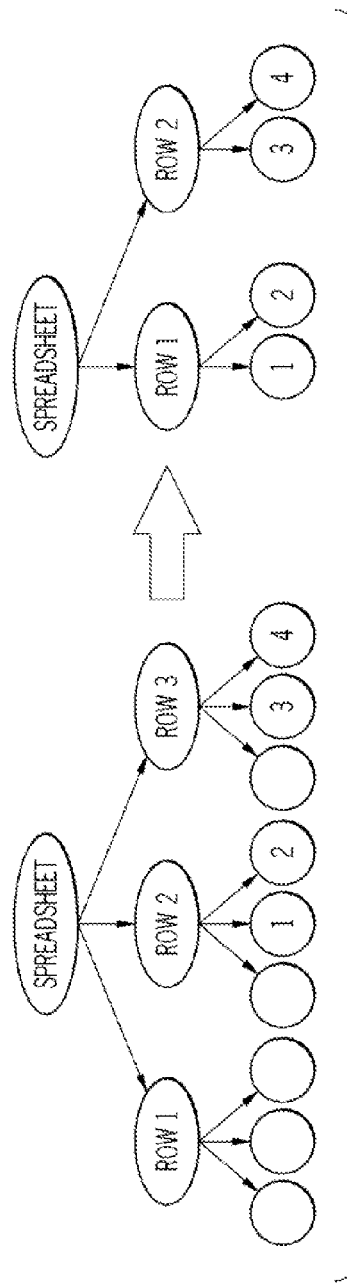

FIG. 13 shows an example of operation for detecting a spreadsheet area (step S29 of FIG. 4). If a spreadsheet object (objects generated by a spreadsheet application or the like) contains blanks, the structure converting section 26 cuts out the smallest rectangular region that covers all cells containing data in one sheet and converts the table included in the cut out rectangular region into a tree structure. Thus, the structure converting section 26 can exclude irrelevant information, thereby making spreadsheet objects more accessible to visually impaired users.

FIG. 14 shows an example of operation for sorting objects (S30 of FIG. 4). If a tab order preset for graphic objects arranged in two-dimensional rectangular form differs from the order in which the graphic objects are arranged in the X-coordinate or Y-coordinate direction, the structure converting section 26 changes the preset tab order to the order in which the objects are arranged in the X-coordinate or Y-coordinate direction in the rectangular arrangement. Thus, the structure converting section 26 can render the relation between multiple graphic objects to be properly identifiable by visually impaired users when the objects are output as speech in the tab order.

Figure 15:
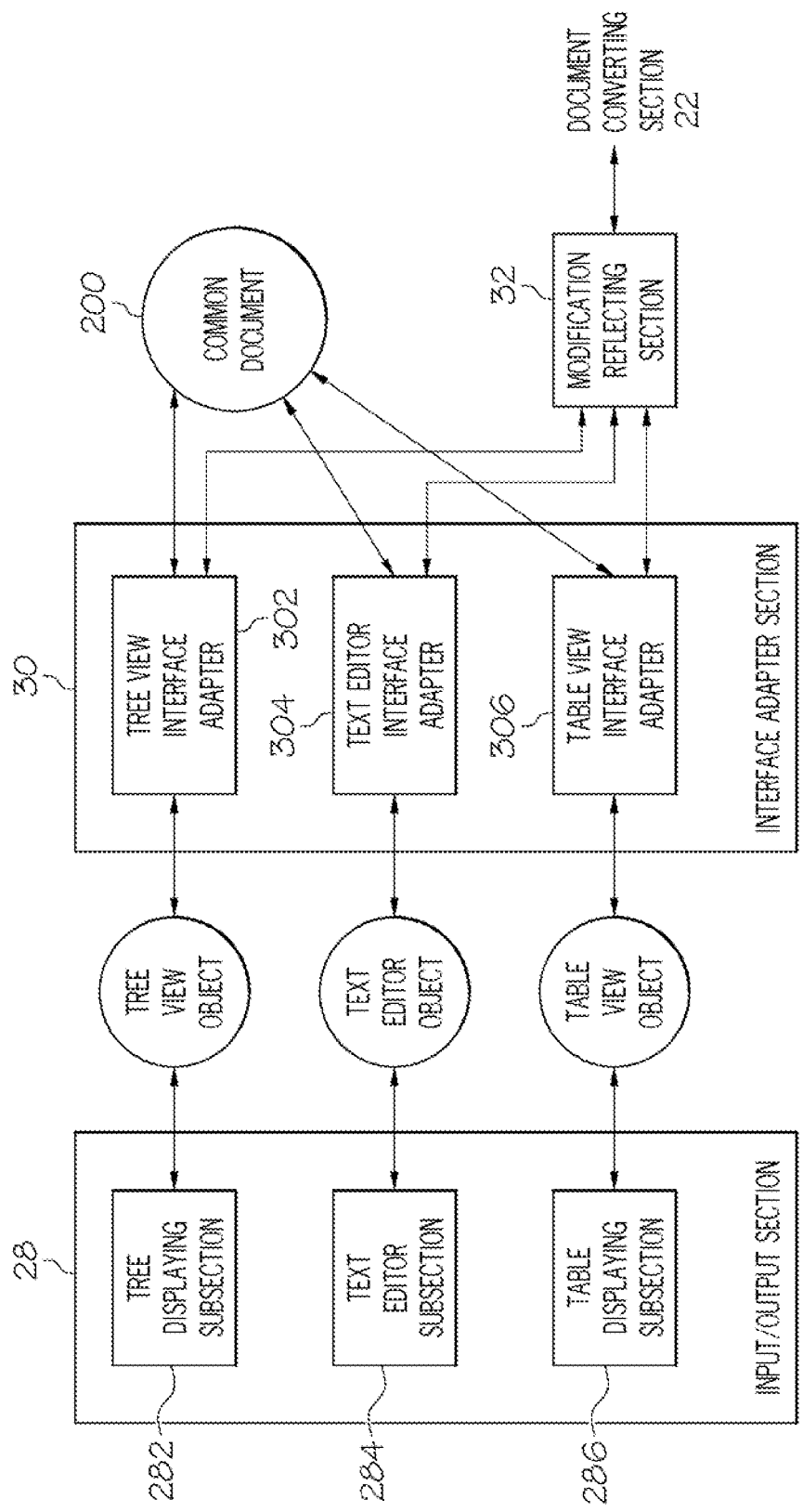
FIG. 15 an exemplary configuration of an input/output section and an interface adapter section according to an embodiment of the present invention together with a modification reflecting section.

FIG. 15 shows an exemplary configuration of the input/output section 28 and the interface adapter section 30 according to the present embodiment along with the modification reflecting section 32. The interface adapter section 30 extracts objects suitable for a user interface to be presented by the input/output section 28 to a user from a common document 200 and provides them to the input/output section 28. That is, the interface adapter section 30 transforms the common document 200 to a format suitable for the user interface and provides it to the input/output section 28. When the input/output section 28 receives a user's operation performed on an object, the interface adapter section 30 issues an action responsive to the operation and also modifies its corresponding object contained in the common document 200 in accordance with the operation.

The interface adapter section 30 may have adapters associated with multiple user interfaces to be presented by the input/output section 28 to the user. For example, if the input/output section 28 has a tree displaying subsection 282, a text editor subsection 284, and a table displaying subsection 286, the interface adapter section 30 may include a tree view interface adapter 302, a text editor interface adapter 304, and a table view interface adapter 306 associated with them. In that case, the tree view interface adapter 302 extracts objects used in a free view from a common document 200 and provides them to the tree displaying subsection 282 which displays objects in tree form. The text editor adapter 304 extracts objects used for editing text from a common document 200 and provides them to the text editor subsection 284 which presents a text editor. The table view interface adapter 306 extracts objects used in displaying a fable from a common document 200 and provides them to the table displaying subsection 286 which displays objects in tabular form.

The input/output section 28 can present objects generated by any application program to a user and modify objects regardless of processing specific to the application program because only the objects that are used for generating an user interface are provided from the interface adapter section 30 to the input/output section 28.

If each of the subsections included in the input/output section 28 (for example the tree displaying subsection 282, text editor subsection 284, and table displaying subsection 286) has an API, the interface adapter section 30 may access the subsections through the API. Each adapter included in the interface adapter section 30 may retrieve a conversion schema stored in the interface conversion rule storing section 34. The conversion schema indicates a conversion rule between objects described in a format specified in each API and objects described in a common data structure. The conversion schema may have a structure in which, for example, the ID unique to each object, the description definition of the object in a common document 200, and the description definition of the object in each subsection of the input/output section 28 are associated together Thus, the interface adapter section 30 can convert objects contained in a common document 200 in a common data structure to a data structure suitable for an appropriate display format.

The interface adapter section 30 may convert a common document 200 to an edit document represented in a data structure specific to a prespecified editing application program for editing the common document 200. In that case, the input/output section 28 outputs the converted edit document to the editing application program to enable a user to use the editing application program to modify the edit, document and inputs the modified edit document as a modified version of the common document 200. Thus, the interface adapter section 30 can enable a common document 200 to be edited by using an external application program. In this way, the interface adapter section 30 enables a user to edit an application-specific document 100 generated by each of multiple application programs by using an editor that the user regularly uses.

Figure 16:
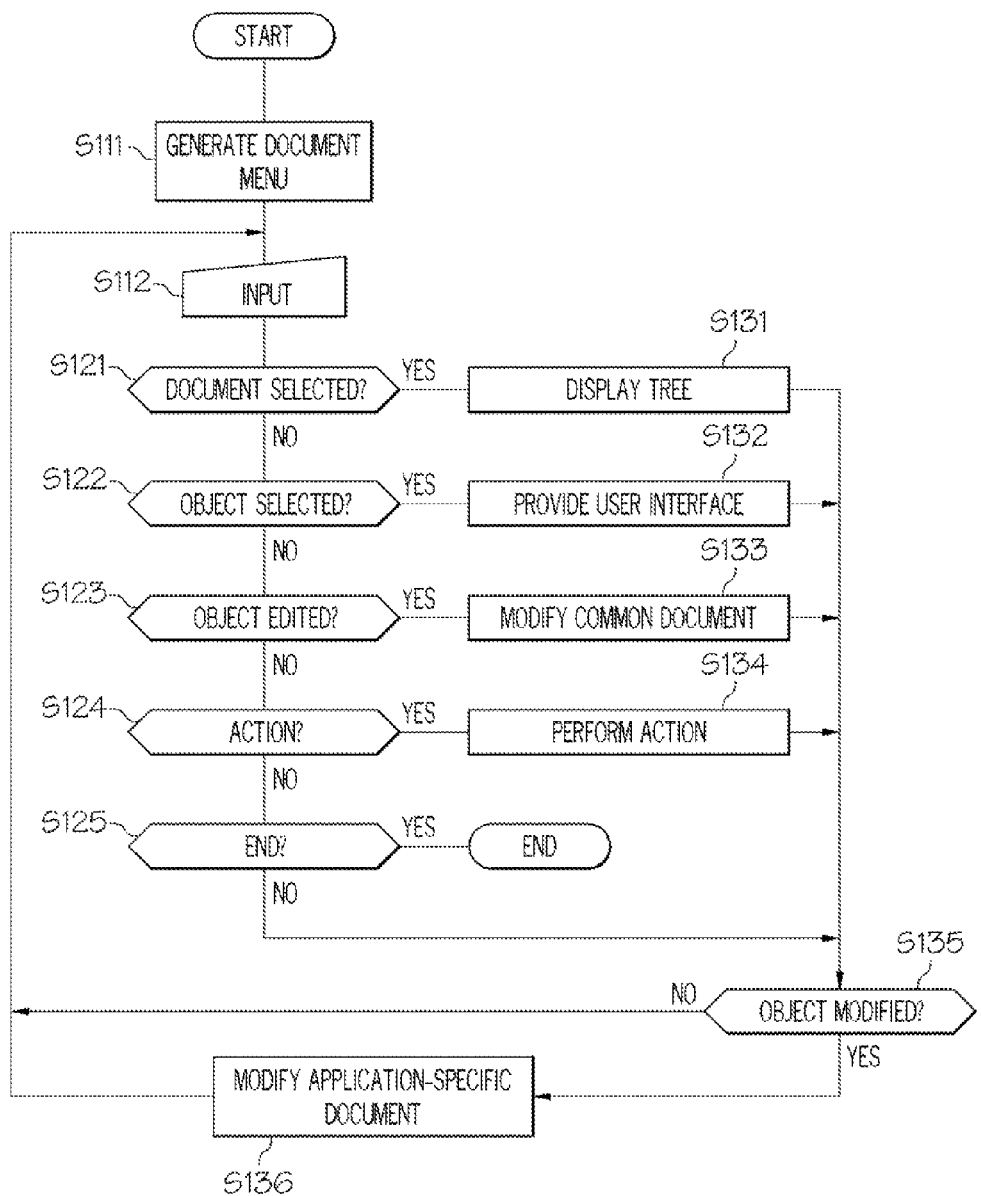
FIG. 16 shows an example of a process performed by input/output section and an interface adapter.

FIG. 16 shows an exemplary flow of process performed by the input/output section 28 and the interface adapter section 30. When a common document 200 is to be presented to a user through the interface adapter section 30, the interface adapter section 30 first generates a menu of documents and the input/output section 28 displays a document menu at the initial step (S111). Then, the interface adapter section 30 detects an operation input by the user (S112), identifies the operation input (S121 to S125), and then performs an action responsive to the operation input (S131 to S134).

For example, when one of the documents on the document list is selected (answer to S121 is Yes), the interface adapter section 30 extracts objects contained in the selected document from a common document 200 and provides the extracted objects to the input/output section 28. The input/output section 28 displays the provided objects in tree format (S131). The input/output section 28 may display different tree views for different application programs. For example, when displaying a document of a presentation program, the input/output section 28 may display a hierarchical tree in which page objects are positioned at upper-level nodes of the tree and graphic objects contained in each page object are positioned under the page object. When a text document is displayed, the input/output section 28 may display a hierarchical tree in which headings are positioned at upper-level nodes of the tree and the other text objects are positioned under the headings. When a business application program is displayed, the input/output section 28 may display a hierarchical tree of objects corresponding to a menu of available functions.

If one of the objects in the tree view is selected (answer to S122 is Yes), then the interface adapter section 30 provides the selected object to the input/output section 28. The input/output section 28 selects and displays a display screen suitable for the object (S132). In that case, the input/output section 28 may ask the user to select an object and may display a display screen appropriate for the selected object. For example, if an object containing editable text is selected, the input/output section 28 may display a text edit control screen. If an uneditable object such as a graphic object is selected, the Input/output section 28 may display a read-only control screen. Furthermore, the input/output section 28 may ask the user for a default value for displaying an object to be edited to complete the screen. For example, in the case of text, the input/output section 28 may ask to a user a font for drawing character strings to be edited. For a graphic object, the input/output section 28 may ask the description of the graphic object to a user.

If the object has been edited (answer to step S123 is Yes), the interface adapter section 30 modifies the corresponding object contained in the common document 200 in accordance with the user's modification input by the input/output section 28 (S133). If an object being displayed is modified, the input/output section 28 alters the display.

If an action operation such as depression of a button is performed (answer to step S124 is Yes), the interface adapter section 30 performs an action responsive to the operation input by the input/output section 28 (S134). For example, the interface adapter section 30 performs a slideshow in a presentation, searches for a document and so on. In that case, the modification reflecting section 32 may notify the action performed by the interface adapter section 30 to the application program executing unit 12 to cause the application program to perform the same action. Thus, the modification reflecting section 32 can reflect the action operation performed in the input/output interface unit 20 in the application program to ensure synchronization of the action.

After completion of processing responsive to the input (S131, to S134), the modification reflecting section 32 determines whether the interface adapter section 30 has modified an object contained in a common document 200 (S135). If the interface adapter section 30 has modified an object (answer to S135 is Yes), the modification reflecting section 32 accesses an appropriate application program executing unit 12 to modify the corresponding object in an application-specific document 100 (S136). In this way, even if an object contained in a common document 200 is modified, the modification reflecting section 32 can reflect the modification in an application-specific document 100 document generated by the application program. Consequently, the modification reflecting section 32 can ensure synchronization between the application-specific document 100 and the common document 200.

If no object is modified (answer to S135 is No) or after the completion of modification at step S136, the modification reflecting section 32 returns to step S112 and waits for an additional input. If an exit operation is performed (answer to step S125 is Yes), the input/output section 28 and the interface adapter section 30 will end the process.

As has been described, the input/output interface unit 20 can reflect an operation input by the input/output section 28 in an application program. Thus, the input/output interface unit 20 can synchronize information presented to a user through the input/output section 28 with information presented to the user by the application program executing unit 12.

The modification reflecting section 32 may reflect in a display provided by the input/output unit section 28 an operation performed on an application program by a user. For example, if an action is performed by an application program, the modification reflecting section 32 may receive notification of the execution of the action from the application program executing unit 12. When the modification reflecting section 32 receives the notification of execution of an action, the interface adapter section 30 executes the same action.

The modification reflecting section 32 may reflect in a common document 200 a modification made to an object contained in an application-specific document 100 in response to an operation input in the application program. For example, if an object contained in an application-specific document 100 has been modified, the modification reflecting section 32 may be notified of the modification by the application program executing unit 12. When the modification reflecting section 32 receives the notification of the modification, the document converting section 22 obtains the modified object contained in the application-specific document 100 in order to reflect, modification in the common document 200.

Thus, even when an action for moving a focus is performed on an application program, the modification reflecting section 32 can reflect the action in the input/output section 28 in real time. Furthermore, even when a document is modified in an application program, the modification reflecting section 32 can reflect the modification in a common document 200. Thus, the modification reflecting section 32 can ensure synchronization between the application-specific document 100 and the common document 200. It should be noted that the modification reflecting section 32 may retrieve an application-specific document 100 in response to a user operation or at regular intervals to maintain synchronization between an application-specific document 100 and a common document 200 even when the modification reflecting section 32 is not notified by the application program.

Figure 17:
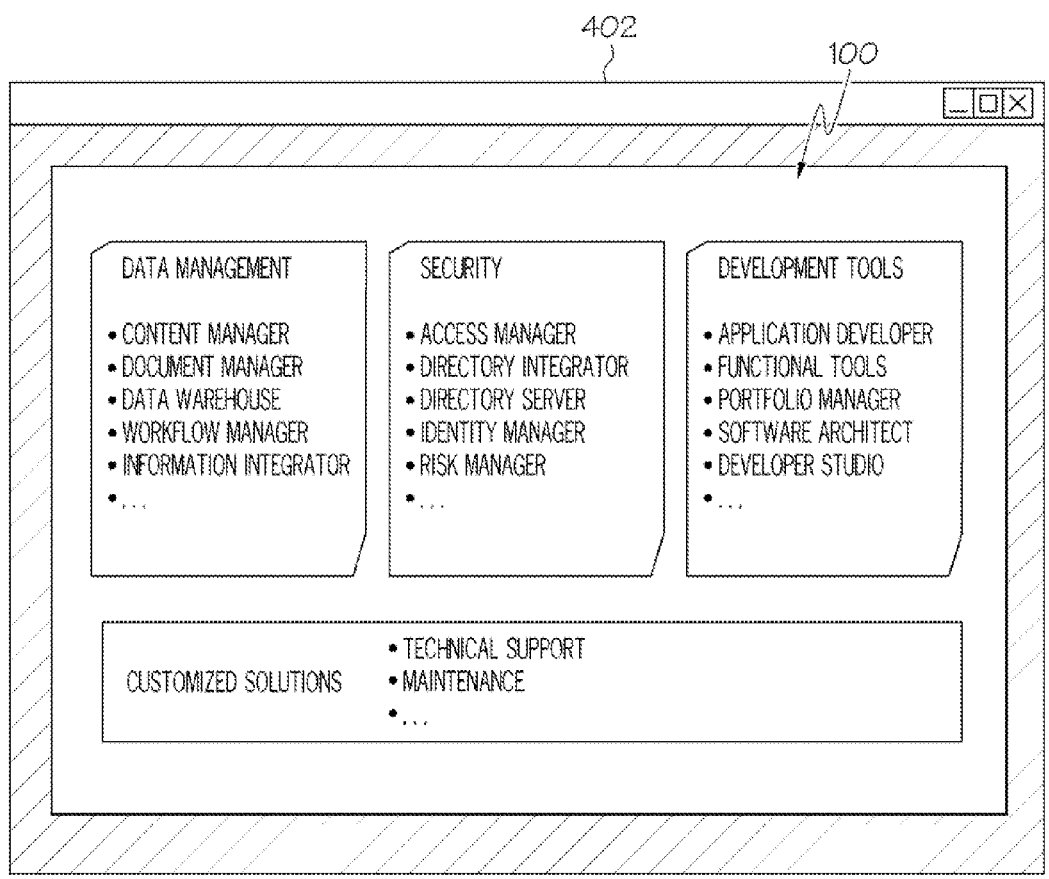
FIG. 17 shows an exemplary display of an application-specific document generated by an application program.
Figure 18:
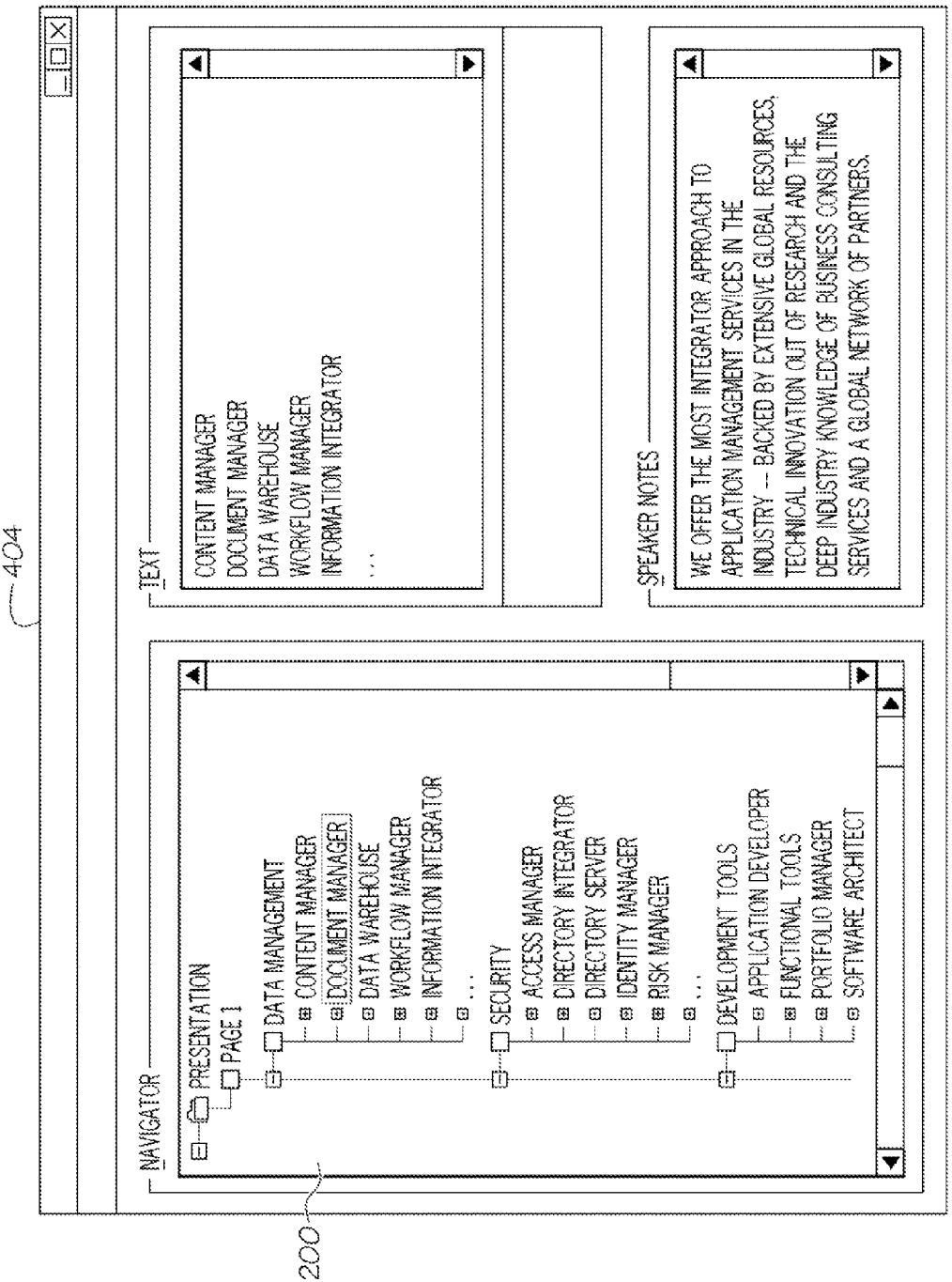
FIG. 18 shows an exemplary display of a common document provided by the input/output interface unit 20 that corresponds to the application-specific document displayed in FIG. 17.

FIG. 17 shows an exemplary display of an application-specific document 100 generated by a presentation program. FIG. 18 shows an exemplary display of a common document 200 corresponding to the application-specific document 100 shown in FIG. 17 displayed by the input output interface unit 20. The application program displays an application-specific window 402 on a display device in which the application-specific document 100 is displayed as shown in FIG. 17. The input/output section 28 of the input/output interface unit 20 displays a common window 404 on the display device in which the common document 200 is displayed as shown in FIG. 18.

The common window 404 is provided separately from the application-specific window 402 and is displayed along with the application-specific window 402. When a modification operation on the common document 200 is input in the common window 404, the input/output interface unit 20 reflects the modification in the application-specific document 100. Thus, the input/output interface unit 20 can modify the display in the application-specific window 402. If a modification operation on an application-specific document 100 displayed by each of multiple application programs in an application-specific window 402 in which the application-specific document 100 is displayed is input, the document converting section 22 reflects the modification made to the application-specific document 100 in the common document 200. For example, in that case the document converting section 22 may reflect the modification to an application-specific document 100 in a common document 200 by receiving a notification of the modification operation from the application program or by retrieving the application-specific document 100 at regular intervals. With the input/output interface unit 20, synchronization between an application-specific document 100 generated by an application program and a common document 200 can be ensured.

Figure 19:
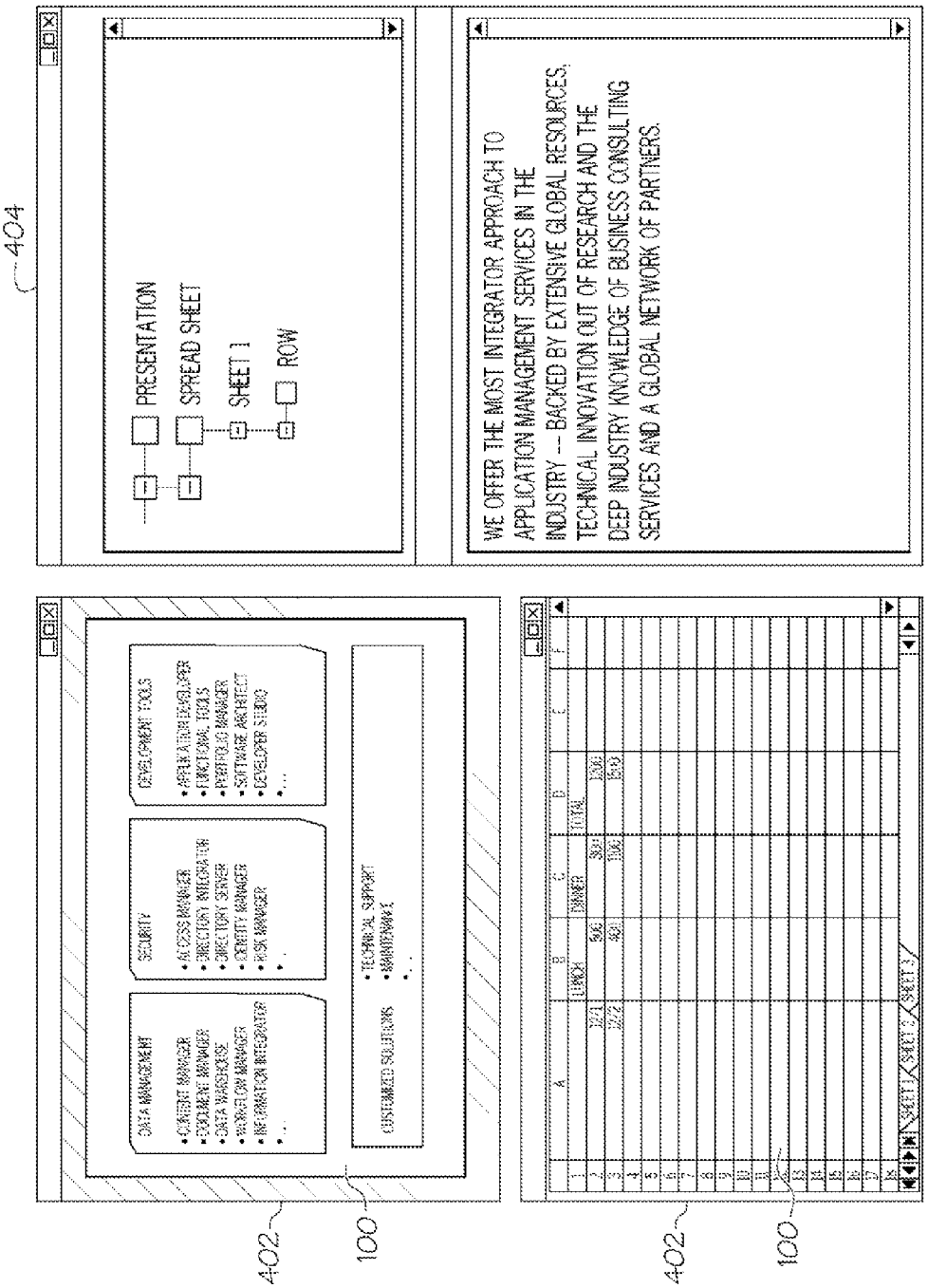
FIG. 19 shows an example in which application-specific documents generated by multiple application programs are edited by using a single input/output interface unit at a time.

FIG. 19 shows an example in which multiple application-specific documents 100 generated by multiple application programs are concurrently handled by the single input/output interface unit 20. Each of the multiple application programs may display an application-specific, window 402 for displaying an application-specific document 100 on the display device. In this case, the input/output section 28 of the input/output interface unit 20 may display a common document 200 in a, common window 404 separate from the multiple application-specific windows 402. The input/output interface unit 20 may display the application-specific documents 100 displayed by each of the multiple application programs in a single tree structure. Thus, the input/output interface unit 20 can enable the multiple application programs to be edited through the same user interface. For example, the input/output interface unit 20 may allow different applications such as a presentation application program and a spreadsheet program to be edited through the same user interface. Furthermore, the input/output interface unit 20 can allow a user to perform tasks on multiple application programs through the same user interface.

Figure 20:
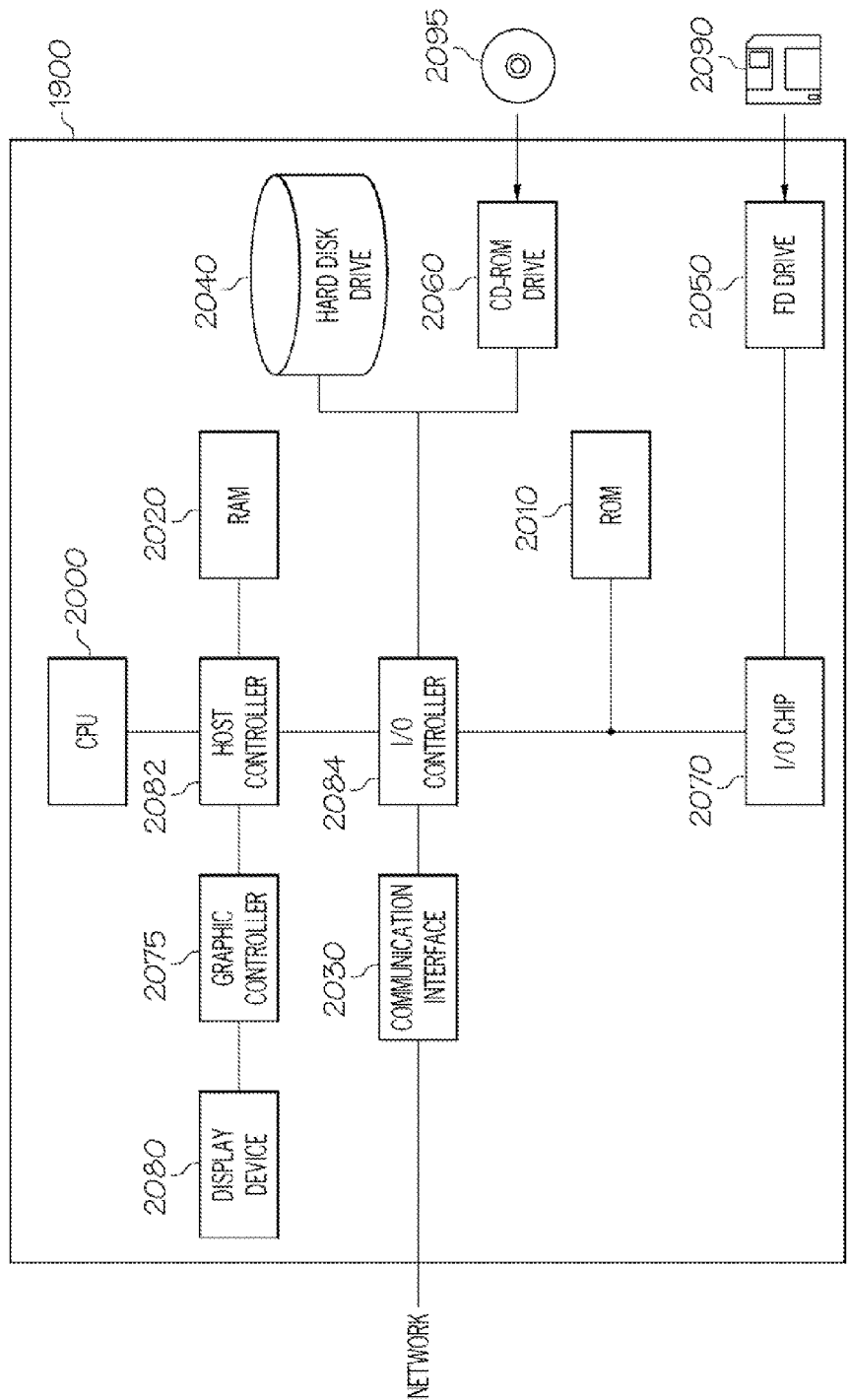
FIG. 20 shows an exemplary hardware configuration of a computer according to an embodiment of the present invention.

FIG. 20 shows an exemplary hardware configuration of a computer 1900 according to the present embodiment. The computer 1900 according to the present embodiment includes a CPU periphery section having a CPU 2000, a RAM 2020, and a graphic controller 2075 and a display device 2080 interconnected through a host controller 2082, an input/output section having a communication interface 2030, a hard disk drive 2040, and a CD-ROM drive 2060 connected to the host controller 2082 through an input/output controller 2084, and a legacy input/output section having a ROM 2010, a flexible disk drive 2050, and an input/output chip 2070 connected to the input/output controller 2084.

The host controller 2082 connects the RAM 2020 to the CPU 2000 and the graphic controller 2075 which access the RAM 2020 at high transfer rates. The CPU 2000 operates in accordance with programs stored in the ROM 2010 and the RAM 2020 to control the components of the computer 1900. The graphic controller 2075 obtains image data generated on a frame buffer provided on the RAM 2020 by the CPU 2000 or other components and displays the image data on the display device 2080. Alternatively, the graphic controller 2075 may include a frame buffer for storing image data generated by the CPU 2000 or other components.

The input/output controller 2084 connects the host controller 2082 to the communication interface 2030, the hard disk drive 2040, and the CD-ROM drive 2060 which are relatively high-speed input/output devices. The communication interface 2030 connects to another apparatus through a network. The hard disk drive 2040 stores programs and data used by the CPU 2000 in the computer 1900. The CD-ROM drive 2060 reads a program or data from a CD-ROM 2095 and provides it to the hard disk drive 2040 through the RAM 2020.

Also connected to the input/output controller 2084 are the ROM 2010, the flexible disk drive 2050, and the input/output chip 2070 which are relatively low-speed input/output devices. The ROM 2010 stores a boot program executed during start-up of the computer 1900 and programs that are dependent on the hardware of the computer 1900. The flexible disk; drive 2050 reads a program or data from a flexible disk 2090 and provides it to the hard disk drive 2040 through the RAM 2020. The input/output chip 2070 connects the flexible disk drive 2050 and various input/output devices through a parallel port, a serial port, a keyboard port, and a mouse port, for example.

A programs that is to be provided to the hard disk drive 2040 through the RAM 2020 is stored in a recording medium such as a flexible disk 2090, a CD-ROM 2095, or an IC card and provided to the hard disk drive 2040 by a user. The program is read from the recording medium, is installed in the hard disk drive 2040 in the computer 1900 through the RAM 2020, and executed in the CPU 2000.

A program installed in the computer 1900 and causing the computer 1900 to function as the input/output interface unit 20 includes a document converting module, a conversion rule storing module, a structure converting module, an input/output module, a user interface module, a modification reflecting module, and an interface conversion rule storing module. The program or modules control the CPU 2000 and other components to cause the computer 1900 to function as the document converting section 22, the document conversion rule storing section 24, the structure converting section 26, the input/output section 28, the interface adapter section 30, the modification reflecting section 32, and the interface conversion rule storing section 34.

The program or modules described above may be store in an external storage medium. The storage medium may be a flexible disk; 2090, a CD-ROM 2095, or other optical recording medium such as a DVD or CD, a magneto-optical disk such as an MO, a tape medium or a semiconductor memory such as an IC card. Alternatively, a storage device such as a hard disk or a RAM provided in a server system connected to a private communication network or the Internet may be used as the recording medium and the program may be provided to the computer 1900 through the network.

While the present invention has been descried with respect to embodiments thereof, the technical scope of the present invention is not limited to the embodiments described above. It will be apparent to those skilled in the art, once taught the invention, that various modifications or improvements can be made to the embodiments. It will be apparent from the claims that such embodiments to which modifications and improvements are made also fall within the technical scope of the present invention.

What is claimed is:

1. Apparatus which provides a common input/output interface to a plurality of application programs, comprising:
a processing unit; and
a computer readable storage medium including computer usable program code configured to be executed by the processing unit, the computer usable program code having,
 a document converting section which converts a plurality of objects contained in an application-specific document generated by each of the plurality of application programs and represented in a data structure specific to the application program to a common document represented in a common data structure that is to represent the objects as nodes of a tree structure;
 a structure converting section which, if at least one attribute of each of the plurality of objects contained in the common document with which the object is to be displayed by a relevant application program satisfies a condition predetermined for at least one predetermined data structure selected between a predetermined table structure and a predetermined list structure, assigns each of the plurality of objects to a node of the predetermined data structure that satisfies the condition to convert the data structure of the common document;
 an output section which presents the common document to a user in a common window and outputs text contained in the common document to a text reader capable of reading text aloud;
 an input section which inputs an operation performed by the user on the common document in the common window;
 an interface adapter section which converts an object contained in the common document to an object used in the output section;
 a modifying section which modifies the common document in accordance with the operation by the user; and a modification reflecting section which reflects a modification to the common document in the application-specific document, wherein the modification is to correspond to the operation by the user.

2. The apparatus according to claim 1, wherein the output section displays objects contained in the common document in a hierarchical tree structure.

3. The apparatus according to claim 1, further comprising a document conversion rule storing section in which a conversion rule for converting each object contained in the application-specific document to an object in the common data structure is described, wherein if a conversion rule for an object contained in the application-specific document is stored in the document conversion rule storing section, the document converting section converts the object contained in the application-specific document to an object in the common data structure in accordance with the conversion rule.

4. The apparatus according to claim 1, further comprising an interface conversion rule storing section in which a conversion rule is described for converting each object in the common data structure contained in the common document to an object in a data structure used in the output section, wherein if a conversion rule for an object used in the output section is stored in the interface conversion rule storing section, the interface adapter section converts the object in the common data structure contained in the common document to an object used in the output section in accordance with the conversion rule.

5. The apparatus according to claim 1, wherein the output section displays the common document in a common window concurrently with an application-specific window on a display device in which the application-specific document is displayed by each of the plurality of application programs.

6. The apparatus according to claim 1, wherein the at least one attribute is to be selected from the group consisting of the position, size, color, and font type.

7. The apparatus according to claim 1, wherein:
the output section converts the common document to an edit document represented in a data structure specific to an editing application program prespecified for editing the common document and outputs the resulting edit document to the editing application program; and
the input section inputs the edit document modified by the user by using the editing application program as the modified common document.

8. The apparatus according to claim 1, wherein:
the output section displays the common document in a common window different from an application-specific window on a display device in which the application-specific document is displayed by each of the plurality of application programs; and
when an operation for modifying the application-specific document is inputted in a window in which the application-specific document is being displayed by the application program, the document converting section reflects the modification to the application-specific document in the common document; and
when an operation for modifying the common document is inputted in the common window by the input section, the modifying section modifies the common document.

9. A method for providing a common input/output interface to a plurality of application programs, the method comprising:
converting a plurality of objects contained in an application-specific document generated by each of the plurality of application programs and represented in a data structure specific to the application program to a common document represented in a common data structure that represents the objects as nodes of a tree structure, wherein the converting includes, if at least one attribute of each of the plurality of objects contained in the common document with which the object is to be displayed by a relevant application program satisfies a condition predetermined for at least one predetermined data structure selected between a predetermined table structure and a predetermined list structure, assigning each of the plurality of objects to a node of the predetermined data structure that satisfies the condition to convert the data structure of the common document;
outputting the common document to a user in a common window;
outputting text contained in the common document to a text reader capable of reading text aloud;
inputting an operation performed on the common document by a user in the common window;
converting an object contained in the common document to an object used in the output;
modifying the common document in accordance with the operation by the user; and
reflecting a modification to the common document in the application-specific document, wherein the modification corresponds to the operation by the user.

10. A computer readable storage device storing a computer program product for providing a common input/output interface to a plurality of application programs, the computer program product comprising a computer readable storage medium having computer usable program code embodied therewith, the computer readable storage medium comprising:
computer usable program code configured as a document converting section which converts a plurality of objects contained in an application-specific document generated by each of the plurality of application programs and represented in a data structure specific to the application program to a common document represented in a common data structure that is to represent the objects as nodes of a tree structure;
computer usable code configured as a structure converting section which, if at least one attribute of each of the plurality of objects contained in the common document with which the object is to be displayed by a relevant application program satisfies a condition predetermined for at least one predetermined data structure selected between a predetermined table structure and a predetermined list structure, assigns each of the plurality of objects to a node of the predetermined data structure that satisfies the condition to convert the data structure of the common document;
computer usable program code configured as an output section which presents the common document to a user in a common window and outputs text contained in the common document to a text reader capable of reading text aloud;
computer usable program code configured as an input section which inputs an operation performed by the user on the common document in the common window;
computer usable program code configured as an interface adapter section which converts an object contained in the common document to an object used in the output section;

computer usable program code configured to modify the common document in accordance with the operation by the user; and computer usable program code configured to reflect a modification to the common document in the application-specific document, wherein the modification is to correspond to the operation by the user.

* * * * *